UNITED STATES PATENT OFFICE.

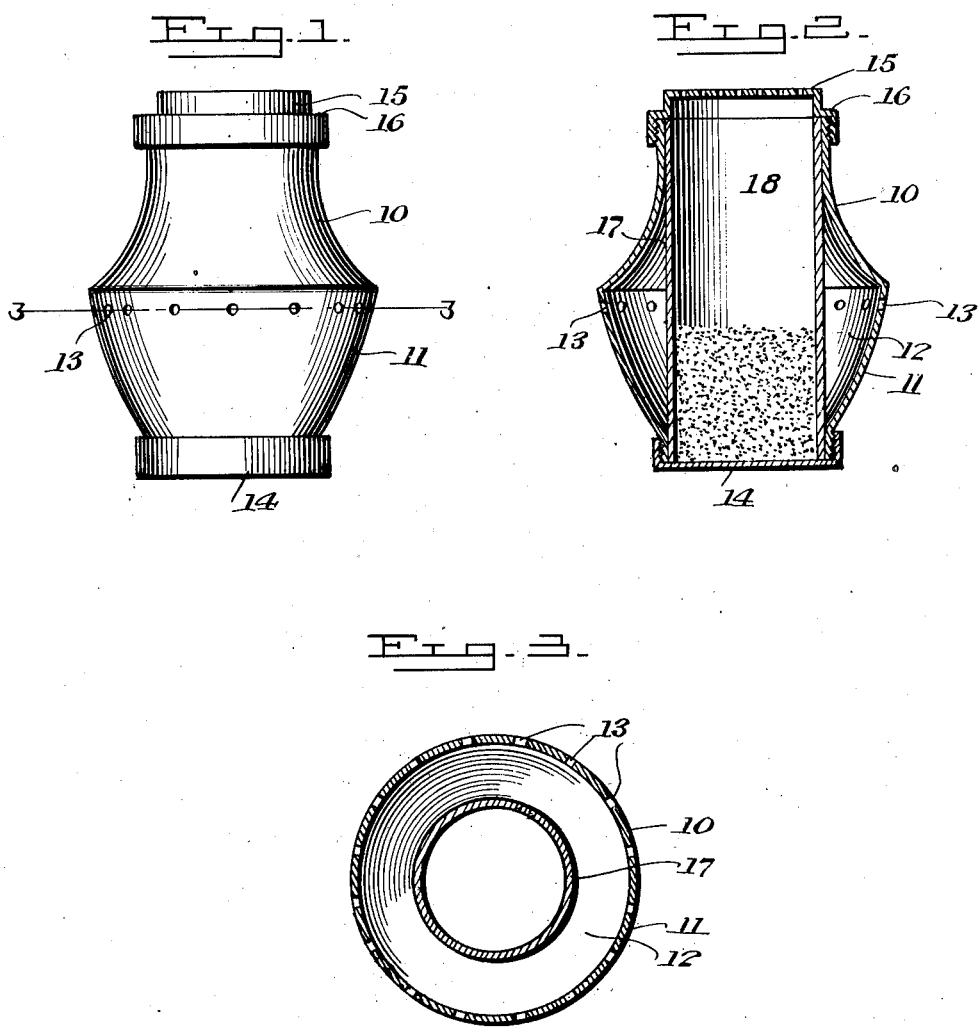

CHARLES G. COLVER, OF PHILADELPHIA, PENNSYLVANIA.

CONDIMENT-HOLDER.

1,095,082.  Specification of Letters Patent.  Patented Apr. 28, 1914.

Application filed November 12, 1913. Serial No. 800,562.

*To all whom it may concern:*

Be it known that I, CHARLES G. COLVER, a citizen of the United States, residing at Germantown, Philadelphia, in the county of Philadelphia and State of Pennsylvania, have invented new and useful Improvements in Condiment-Holders, of which the following is a specification.

An object of the invention is to provide a simple condiment holder, preferably adapted for use on the table and which will keep the contents thereof in a clean and dry condition.

The invention contemplates, among other features, the provision of a condiment holder which can be cheaply manufactured and which, particularly when containing salt, will keep the same in a dry condition, it being well known that the salt in condiment holders ofttimes becomes impregnated with moisture and is unfit for further use, while at the same time it cannot be conveniently removed from the condiment holder in view of the fact that it becomes lumpy and hard and cannot be conveniently sifted. In my invention I aim to provide a construction whereby any moisture in the salt or other condiment in the holder will be absorbed by a paper or fibrous member having communication with the atmosphere.

In the further disclosure of the invention reference is to be had to the accompanying drawings, constituting a part of this specification, in which similar characters of reference denote corresponding parts in all the views, and in which:

Figure 1 is a side elevation of my condiment holder; Fig. 2 is a vertical sectional view; and Fig. 3 is a horizontal sectional view taken on the line 3—3 in Fig. 1.

Referring more particularly to the views, I provide a casing 10 preferably made of aluminum or some other light material and having a bulged portion 11 forming an air chamber 12, the said bulged portion 11 of the casing 10 being provided with a series of air openings 13, as shown. A base 14 of metal has threaded connection with the lower end of the casing 10 and similarly a sifter cap 15, suitably perforated, has threaded connection with the upper end of the casing 10, the said cap 15 being formed to provide a circular shoulder 16, against which is adapted to abut the upper end of a cylinder 17 preferably made of cardboard or fiber having its lower end abutting against the inner face of the base 14.

In assembling the device described the base 14 is unscrewed from the casing 10 and the cylinder 17 is arranged within the casing as shown, after which, by reapplying the base to the casing, the cap 15 is removed and the interior of the cylinder filled with the desired condiment, such as salt or the like, it being readily apparent that the base 14 forms the bottom for the cylinder, thus providing a suitable chamber 18 for the reception of the condiment. The cap is now screwed on the casing so that the shoulder 16 will abut against the upper end of the cylinder, thus rigidly positioning the cylinder within the casing and the condiment holder is then used in the usual manner by tilting the same in order to sift the condiment through the perforated cap 15.

By providing the air openings 13 a current of air can at all times circulate through the chamber 12 and any moisture with which the condiment in the chamber 18 may become impregnated, will be absorbed by the material from which the cylinder 17 is constructed and similarly the current of air passing through the air chamber 12 will absorb the moisture previously absorbed by the cylinder 17. Therefore, it will be apparent that my device is not only adapted to retain a condiment in a clean and dry condition but also provides a structure which can be cheaply manufactured, will present a neat appearance and, furthermore, will retain the condiment in a sanitary and wholesome condition.

Having thus described my invention, I claim:

1. As a new article of manufacture, a condiment holder comprising a metallic casing having a series of openings communicating with an air chamber formed by the casing, a base for the casing, a sifter cap closing the upper end of the casing, and a cylinder formed of an absorbent material and contained in the said casing, with the said cylinder adapted to receive and hold the condiment and absorb any moisture therefrom.

2. In a condiment holder, the combination with a casing having a bulged portion forming an air chamber and provided with a series of openings communicating with the air chamber, of a cap for closing the upper end of the casing, and an absorbent cylinder arranged within the casing and held in position by the cap to absorb moisture from condiments carried within the cylinder.

In testimony whereof I affix my signature in presence of two witnesses.

CHARLES G. COLVER.

Witnesses:
 CHARLES KOSTENBADER,
 DAVID RAY.